United States Patent [19]

Johnson et al.

[11] 4,311,374
[45] Jan. 19, 1982

[54] CAMERA FLASH ARRAY AND HOLDER RECEPTACLE

[75] Inventors: Bruce K. Johnson, Andover; John B. Morse, Boston, both of Mass.

[73] Assignee: Polaroid Corporation, Cambridge, Mass.

[21] Appl. No.: 175,423

[22] Filed: Aug. 5, 1980

[51] Int. Cl.³ ............................................. G03B 15/03
[52] U.S. Cl. .................................................. 354/144
[58] Field of Search .................. 362/3, 10, 13, 14, 15; 431/357, 359; 354/126, 129, 141, 143, 144, 145

[56] References Cited

U.S. PATENT DOCUMENTS

| D. 255,457 | 6/1980 | Conner et al. | D16/5 |
| 2,871,775 | 2/1959 | Van Der Mei | 354/129 |
| 3,544,251 | 12/1970 | Brandt | 354/128 X |
| 3,747,489 | 7/1973 | Brandt et al. | 354/132 |
| 3,757,643 | 9/1973 | Burgarella | 362/13 X |
| 3,857,667 | 12/1974 | Vetere et al. | 362/11 X |
| 3,990,833 | 11/1976 | Holub et al. | 362/15 X |
| 4,016,579 | 4/1977 | Lewis | 354/126 |

Primary Examiner—Donald A. Griffin
Attorney, Agent, or Firm—David R. Thornton

[57] ABSTRACT

A flash illumination system for photographic cameras including a foldable flash holder having a receptacle well formed to complement the base of a disposable flash array. The flash array base extends across the length of the array and is established by a rigid printed circuit board. Detent apertures in the board become aligned with detent projections when the flash array is inserted into the well. A retention bias is established exclusively by electrical contact blades in engagement with one face of the printed circuit board.

8 Claims, 6 Drawing Figures

CAMERA FLASH ARRAY AND HOLDER RECEPTACLE

BACKGROUND OF THE INVENTION

This invention relates to photographic equipment and more particularly, it concerns a flash illumination system for cameras.

Commonly assigned U.S. Pat. No. 4,268,146 of B. K. Johnson and U.S. Pat. No. 4,231,645 of C. W. Davis, et al., disclose camera and foldable flash unit arrangements in which the flash unit is movable as part of the camera between an operative erect position and a folded storage position. In the erect position, working exterior components of both the camera (e.g., the objective lens, view finder, range finder and photometer) and the flash unit (e.g., the source of illumination) are conditioned in the conventional forwardly facing orientation for exposure of film carried in the camera. In the folded position, the flash unit fits into a complementing formation of the camera housing in a manner such that the same working components are completely enclosed by exterior casing portions of the camera and of the flash unit. As a result, not only is the use of flash illumination facilitated by simple movement of the flash unit to the erect position, but also the need for auxiliary casings and the like to protect sensitive camera components during storage and handling is completely avoided.

The arrangements disclosed in the aforementioned copending applications are particularly suited for electronic flash units in which the source of illumination is permanently contained in the flash unit housing and presented at a window in a unit housing face which moves against the camera housing when the unit is moved to the folded position. As compared with cameras equipped with disposable flash bulbs or plural flash bulb arrays, cameras equipped with a folding or otherwise "built-in" electronic flash unit entail manufacturing costs which are reflected in a higher overall camera price. In order to make available a variably priced family of cameras related in terms of structural geometry and capable of using the same film, therefore, there is a need for low-cost cameras in which a source of flash illumination is accommodated simply by a receptacle in the camera and into which a disposable flash bulb or flash bulb unit may be inserted. Although such receptacles or flash holders traditionally have been incorporated in the camera housing, the folding flash unit geometry of the aforementioned copending applications has many advantages such as providing a protective enclosure for delicate camera components as mentioned.

In contrast to electronic flash units, however, the adaptation of a pivotal flash holder for disposable bulbs for multi-bulb arrays presents several problems peculiar to the mechanical retention, electrical connection and general handling requirements of disposable flash bulb arrays. For example, the mechanical retention of the flash bulb array by the holder must be strong enough to allow pivotal movement of the holder by one who might grasp only the flash bulb array rather than the body of the holder. Damage to either the bulb array or to the holder as a result of such improper manipulation of the assembly must be avoided. Also, the mechanical or physical retention of the flash bulb array by the holder must be of sufficient structural integrity to maintain good electrical contact between bulb array terminals and contact terminals supported within the holder. Yet, in keeping manufacturing costs of the holder to a minimum these physical requirements must be attainable without complex structural components or component organizations which pose problems to manufacturing assembly.

SUMMARY OF THE INVENTION

In accordance with the present invention, a highly effective flash illumination system is provided in which a folding holder and multi-bulb flash array structure are combined in an unique manner. The holder serves both as an electric receptacle and camera mounting for the flash array and as a cover or closure for protecting delicate components of a camera fitted with the holder. The flash array includes a plurality of individual flash bulbs enclosed by a preformed and folded envelope secured to an elongated, rigid supporting board having a linear bottom edge to be received in a complementing slot forming part of a receptacle well in the holder. Retention of the array in the holder is through a detent arrangement under a biasing force supplied exclusively by electrical contact blades in the holder. The supporting board, coupled with the shape of the base portion of the array and the receptacle configuration provides rigidity against bending and also excludes insertion of an improper flash array into the holder.

Among the objects of the present invention are, therefore: the provision of an improved flash illumination system for cameras; the provision of such a system having a holder which serves both to protect camera components and also to locate a disposable flash bulb array in a desirable position with respect to the camera; and the provision of a foldable flash holder and flash array assembly which is easily handled, ruggedly assembled and mutually exclusive from the standpoint of preventing the insertion of improper flash bulb arrays.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENTS

Figure 1:
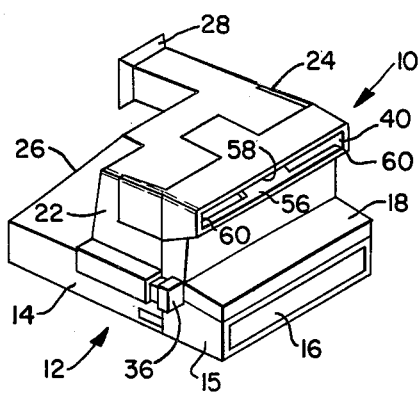
FIG. 1 is a perspective view of a camera including the folding flash holder of the present invention shown in a folded position.
Figure 2:
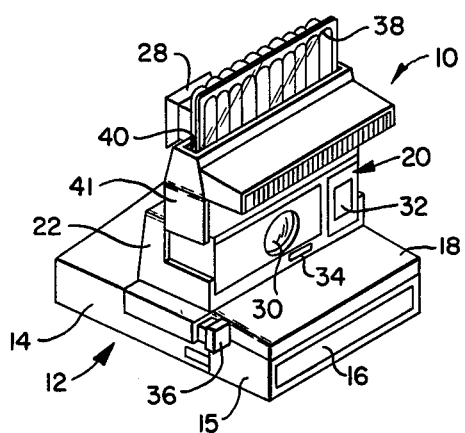
FIG. 2 is a similar view of the camera of FIG. 1 with an inserted flash array and with the flash holder shown in an erect position.

In the accompanying drawings, the flash holder of the present invention is generally designated by the reference numeral 10 and in FIGS. 1 and 2, is shown assembled with a camera 12. Although many features of the flash holder 10 to be described are adaptable to cameras other than the camera illustrated in FIGS. 1 and 2, a brief description of the camera 12 to which the holder 10 is particularly suited for use will facilitate an appreciation of certain structural and functional characteristics of the present invention.

The camera 12 is of a well known general class of instant or self-developing cameras and, as such, includes a base section 14 having a latched pivotal door housing 15 through which a pack of film units may be loaded into the base section. Also as is well known, individual film units are discharged through an opening 16 in the door housing after exposure. The upper front portion of the camera housing overlying the door housing is defined on its exterior by an apron 18 which extends rearwardly to a forwardly facing lens mount wall 20 which as shown in FIG. 2, is in the nature of a vertical front face on the exterior housing of the camera 12. The wall 20 joins with a pair of sidewalls 22 and a top wall 24, the latter joining with an inclined rear wall 26 to form an interior exposure chamber. Also, the top wall 24 extends rearwardly to a view finder eyepiece 28 as shown in FIG. 1.

Presented in the front face 20 are various exterior optical components of the camera including an objective lens 30 and a view finder lens 32. In addition, a photocell window 34 may be provided in the front face 20 assuming the camera to be equipped with an automatic exposure control system. In the disclosed camera, an actuating button 36 is shown displaced laterally of the lens mount wall 20 at the juncture of the sidewall 22 with the base section 14.

As implied by the alternative positions illustrated in FIGS. 1 and 2, the flash holder 10 is pivotally supported from the camera 12, specifically the sidewalls 22 thereof, for movement between a folded or closed position as shown in FIG. 1 to an unfolded or erect position as shown in FIG. 2. Inasmuch as the primary function of the holder 10 is to receive and support a disposable flash bulb unit or flash array 38, the holder 10 is provided with an elongated receptacle well 40 which generally complements the array 38 to mechanically retain and also to electrically connect the flash array 38 with a power supply and switching components (not shown) within the housing of the camera 12 all in a manner to be described in more detail below.

Figure 3:
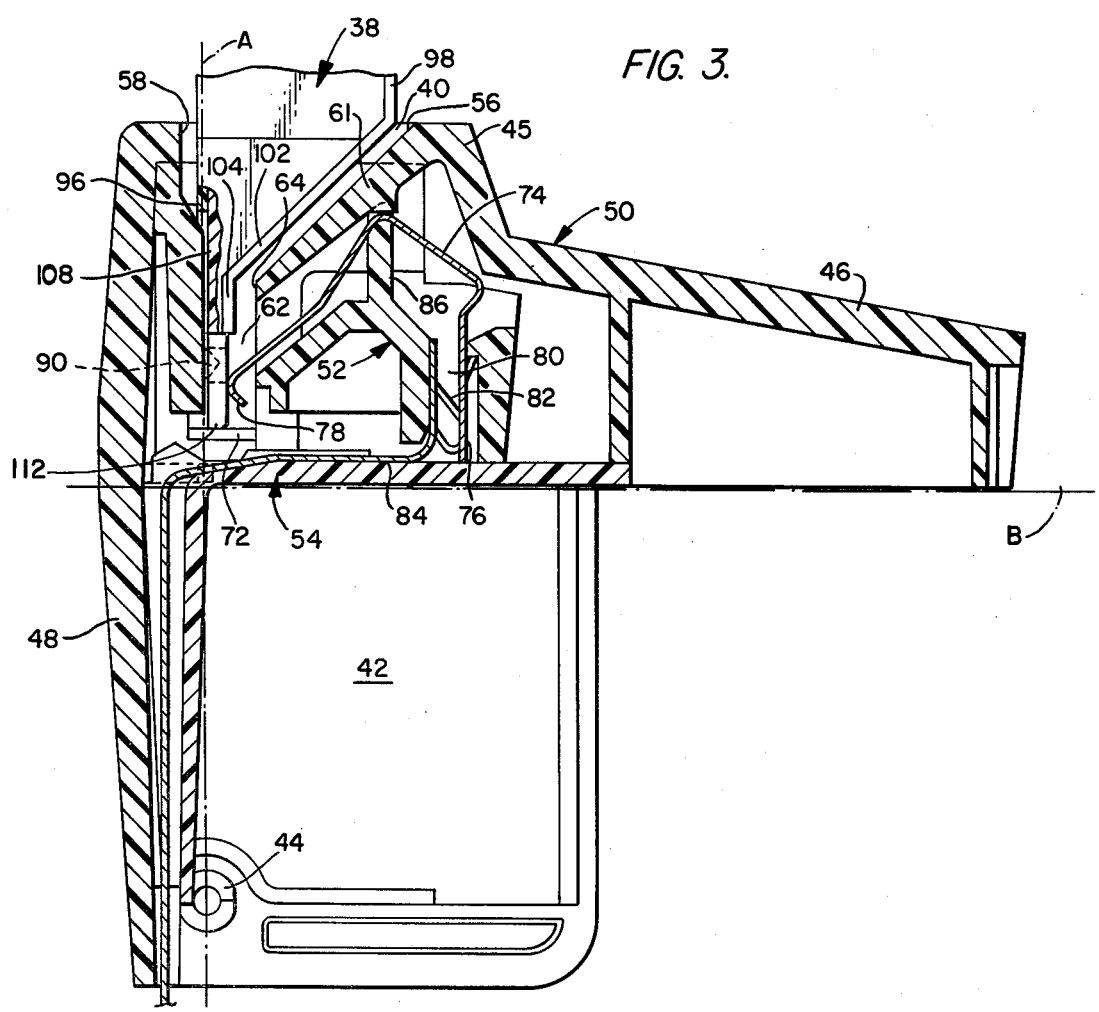
FIG. 3 is an enlarged segment of a vertical cross-section through the flash holder and assembled flash array.

As may be seen by reference to FIGS. 2 and 3 of the drawings, wherein the flash holder 10 is in its erect condition, the overall geometric configuration of the holder may be related to a pair of mutually orthogonal reference planes, that is, a first reference plane A and a second reference plane B. Thus, a pair of sidewalls 41 and 42 which are perpendicular to both reference planes A and B, extend in one direction from the reference plane B and carry inwardly projecting pintle formations 44 to establish a pivotal axis in the plane A spaced from and parallel to the reference plane B. A cover portion 46 projects forwardly of the first reference plane A on the side of the plane B opposite to the side thereof from which the sidewalls extend. A receptacle well 40 is located in a rail or rail-like formation 45 between the reference plane A and the cover portion 46. Finally, the rail formation 45 extends around the well 40 to a rear wall portion 48 which is spaced slightly to the rear of the reference plane A.

In a copending application Ser. No. 175,422, filed concurrently herewith by the inventors F. Finnemore and J. Morse and entitled "Foldable Flash Holder Assembly," now abandoned and replaced by application Ser. No. 270,144, filed June 3, 1981, the holder 10 is described and illustrated in detail to be comprised of a snap fit assembly of three molded plastic parts. Since the assembly of these parts involves a separate invention, the parts are not completely shown in the drawings appended hereto. On the other hand, the parts appear in the cross-section of FIG. 3 and include a hood component 50, a contact retainer 52 and an underhousing component 54. Also it will be noted from FIG. 3 that the hood component 50 is an integral molding of a suitable synthetic resinous material shaped to provide the previously described sidewalls 41 and 42, rail formation 45, cover portion 46 and the rear wall 48. The hood 50, moreover, provides a basic supporting structure for all other components of the holder 10.

Figure 4:
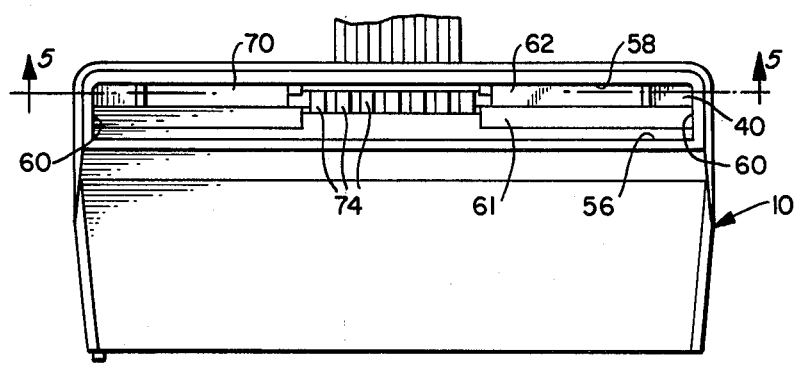
FIG. 4 is a top plan view of the foldable flash holder.
Figure 5:
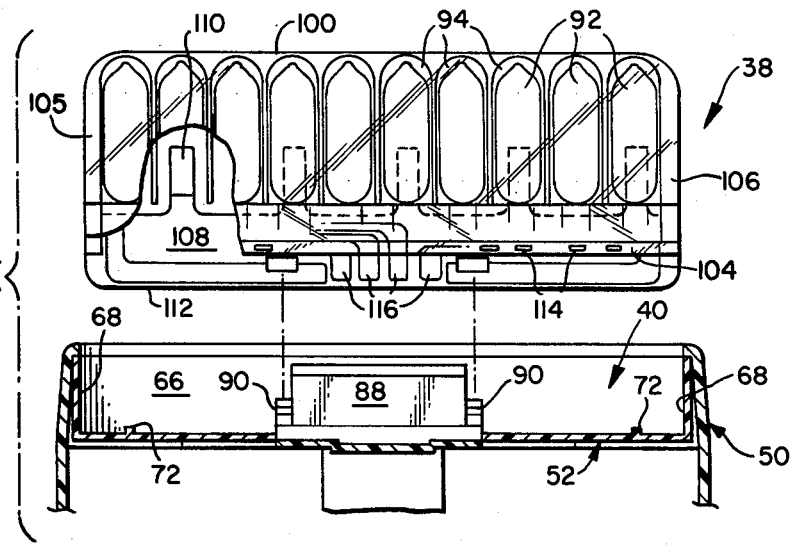
FIG. 5 is a combined front view of the flash array and cross-section on line 5—5 of FIG. 4.

As may be seen in FIGS. 1, 3 and 4, the receptacle well 40 is defined by the hood component 50 and the contact retainer 52 to establish an elongated rectangular mouth circumscribed by front, back and side edges 56, 58 and 60, respectively, in the hood component 50. As shown in detail in FIG. 3, an inwardly and downwardly inclined wall 61 extends from the front edge 56 to a relatively narrow, elongated receptacle slot 62 having a front surface 64, a rear surface 66 which is generally flush with the back edge 56 of the mouth of the receptacle well 40, and end surfaces 68 (FIG. 5) which are flush with the side edges of the receptacle mouth. In FIGS. 4 and 5, the bottom, or floor 70, of the well 40 is shown to include a pair of laterally spaced fore/aft ribs 72. Thus, it will be seen that the major portion of the well 40 is defined by structure included in the contact retainer 54 whereas little more than the mouth of the well is defined by structure incorporated in the hood 50.

As shown in FIGS. 3 and 4, a plurality of resilient metal contact blades 74 are supported by the contact retainer 52. The blades 74 are positioned centrally of the well 40 and each is of a configuration to provide a connecting end 76 and contact end 78. The connecting ends 76 of the several contact blades are confined by a slot 80 in the contact retainer 52 so that struck out tangs 82 on the blades make electrical contact with individual conductive strips on a flexible, ribbon-like cable 84. The cable extends to control circuitry (not shown) contained within the camera 12.

The central portions of the blades 74 are bent as shown in FIG. 3 to be supported by a rail portion 86 of the contact retainer 52. In light of the connecting ends 76 being anchored in the slot 80, therefore, the contact ends of the several blades 74 project rearwardly in cantilever fashion past the front surface 64 of the receptacle slot 62 against the rear surface of the slot. In this latter respect, it will be noted by reference to FIGS. 4 and 5 of the drawings, for example, that the rear surface 66 of the receptacle slot 62 is provided with a centrally disposed planar boss formation 88, the front surface of which is displaced forwardly of the rear surface 66 of the receptacle slot 62. Thus normally, the contact ends 78 of the blades 74 will be biased against the surface of the planar boss 8. Also, it will be observed that on opposite ends of the boss 88 a pair of lugs 90 project forwardly beyond the planar surface of the boss 88 for reasons which will be described in more detail below.

Figure 6:
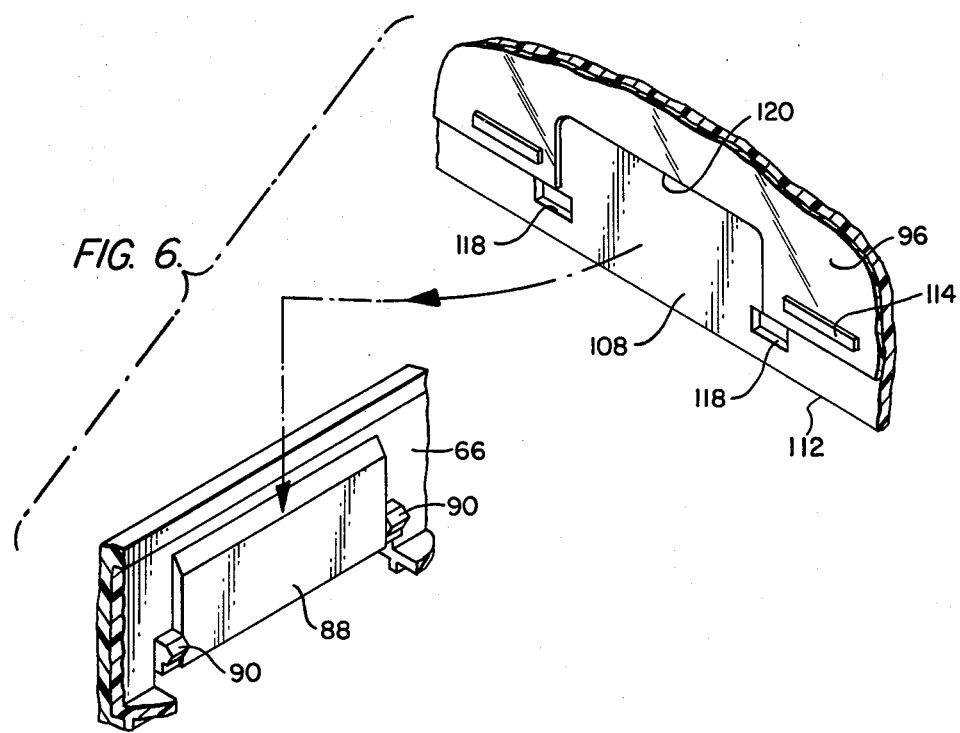
FIG. 6 is an exploded fragmentary perspective view illustrating complementing portions of the flash array and of the holder.

The physical construction of the flash array 38 may be appreciated from the illustrations in FIGS. 2, 3 and 5 of the drawings. A plurality of, specifically ten, individual flash bulbs 92 are positioned in a corresponding number of reflector cells 94 defined by an integral, prestamped and folded sheet or envelope of transparent plastic material having a back panel 96 and a front panel 98 (FIGS. 3 and 6). The back panel is shaped to provide the cells 94 and is interiorally coated with a polished reflective material such that each cell 94 provides a reflector for the respective flash lamp 92 positioned therein. The front panel 98 is transparent and extends from a top edge or fold 100 downwardly to an inclined bottom section 102 (FIG. 3) which terminates in a vertical bottom skirt 104. The front and back panels 96 and 98 are sealed to each other along side edges 105 and 106 (FIG. 5).

Primary structural support for the flash array 38 is provided by a printed circuit board 108 formed, for example, of phenolic resins or of glass reinforced epoxy resin in accordance with conventional practice in the circuit board art. The circuit board 108 is provided with upstanding fingers 110 which extend within the cells 94 behind the lamps 92. Also, it will be noted that at least the bottom edge 112 of the board 108 is linear and extends throughout the length of the entire flash array 38. The envelope of transparent plastic material including the panels 96 and 98 are secured to opposite sides of the board 108 by suitable means such as staples 114. Printed circuit terminals 116 extend below the skirt 104 of the front panel in a position to be engaged by the contact ends 78 of the blades 74.

A pair of apertures 118 are punched through the lower edge of the board 108 so as to register with the lugs 90 on opposite sides of the planar embossment 88 in the back surface 66 of the receptacle well 40. Also, and as shown in FIG. 6, a lower central portion of the back panel 96 is cut out at 120 so that the back surface of the circuit board 108 may lie directly against the front face of the planar embossment 88.

To insert the flash array 38 into the receptacle well 40, the flash array is pressed downwardly into the well until the bottom edge 112 of the printed circuit board 108 engages the fore/aft ribs 72. When the flash array has reached this position, the apertures 118 will have registered with the lugs 90 and the contact ends 78 of the blades 74 will be in firm engagement with the printed circuit terminals 116 on the board 108. The contact blades 74 serve also to retain the board 108 firmly against the planar front surface of the embossment 88 so that the lugs 90 will be retained in the apertures 118. Removal of the array from the receptacle is the reverse of insertion but will require a sharp pull for the apertures 118 to clear the lugs 90.

As may be observed in FIG. 3 of the drawings, the tapered bottom wall 102 on the flash array 38 complements the inclined wall 61 of the receptacle well 40 in a manner such that any force applied to the flash array 30 after its insertion into the well 40 in a direction tending to pivot the holder 10 between its closed and erect positions as shown, respectively, in FIGS. 1 and 2 will be transmitted from the flash array 30 to the holder primarily by the relatively strong circuit board 102 but in addition, by a moment arm extending between the lugs 90 against the inclined wall 61. Moreover, the extension of the board 102 completely throughout the length of the flash array and of the receptacle well further strengthens the assembly of the array in the well.

Also it will be noted that insertion of the flash array 38 into the well 40 is guided by numerous cooperating control surfaces. For example, lateral positioning of the lamp array is controlled by opposite ends of the board 102 engaging the end walls 68 of the well. The enlarged mouth of the well together with the inclined wall 61 assures that the board will be directed easily into the slot 62. The fore/aft ribs 72 at the bottom of the well limit the extent to which the board may be inserted. Also, the complementing tapered conformation at the base of the envelope front panel 98 and of the wall 61 prevent improper insertion of the array into the well. Finally, the configuration of the well and of the flash array base is unique in camera flash illumination systems and, therefore, will prevent insertion of a flash array which is not designed for use with the holder 10 and the camera 12.

Thus it will be appreciated that as a result of the present invention, a highly effective flash illumination system is provided. It will be apparent to those skilled in the art from the preceding description, and it is further contemplated, that changes and/or modifications may be made in the embodiment described and illustrated herein without departure from the present invention. Accordingly, it is expressly intended that the foregoing description is illustrative of a preferred embodiment only, not limiting, and that the true spirit and scope of the present invention will be determined by reference to the appended claims.

What is claimed is:

1. A camera for use with a disposable flash array, the array comprising a relatively thick body portion and a relatively thin blade portion, the body portion enclosing a plurality of flash bulbs, the flash array being an elongated array having its flash bulbs in side by side arrangement, the blade portion carrying a plurality of flash contact terminals, said camera comprising a camera housing, a flash holder mounted on said camera housing for pivotal movement from a folded inoperative arrangement to an erect operative arrangement, said flash holder having a receptacle well including a relatively wide mouth communicating with a relatively narrow slot, said mouth being configured to receive and conform to at least parts of a lower section of the body portion of the flash array, said receptacle mouth being an elongated opening, said flash holder being mounted on said camera housing for pivotal movement around an axis parallel to the longitudinal axis of said mouth opening, said mouth conforming to parts of the forward and rear surfaces of the array, and said slot being configured to receive the blade portion of the flash array when it is operatively positioned in said flash holder whereby when an operator pivots said flash holder from its erect arrangement to its said folded arrangement by grasping the flash array, a major portion of the forces involved are transferred from the body portion of the flash array to said flash holder thereby protecting the thin blade portion from damage.

2. The camera of claim 1 wherein the blade of the flash array extends along substantially the full length of the elongated array, and wherein said slot extends along the full length of said elongated opening.

3. The camera of claim 1 wherein the body portion of the flash array includes a forwardly facing inclined surface where it joins said blade portion, and said receptacle mouth includes an inclined surface configured to conform to said inclined surface of the flash array.

4. The camera of claim 1 wherein the blade portion of the flash array includes a pair of spaced apart apertures, and wherein said flash holder slot includes a pair of projections configured to conform to and enter the apertures of the flash array blade portion when the flash array is mounted in said flash holder.

5. The camera of claim 1 wherein said slot of said flash holder receptacle includes a bottom reference surface, and said projections urge the bottom edge of the flash array blade portion against said reference surface when said projections seat within the apertures of the blade portion.

6. A camera for use with a disposable flash array, the array comprising a relatively thick body portion and a relatively thin blade portion, the body portion enclosing a plurality of flash bulbs, the blade portion carrying a plurality of flash contact terminals, said camera comprising a camera housing, a flash holder mounted on said camera housing for pivotal movement from a folded inoperative arrangement to an erect operative arrangement, said flash holder having a receptacle well including a relatively wide mouth communicating with a relatively narrow slot, said mouth being configured to receive and conform to at least parts of a lower section of the body portion of the flash array and said slot being configured to receive the blade portion of the flash array when it is operatively positioned in said flash holder whereby when an operator pivots said flash holder from its erect arrangement to its said folded arrangement by grasping the flash array, a major portion of the forces involved are transferred from the body portion of the flash array to said flash holder thereby protecting the thin blade portion from damage, and said flash holder includes a plurality of resilient connectors extended within said slot toward a given interior surface thereof, and said given surface includes a raised surface portion configured to support the blade portion firmly under the influence of said resilient connectors.

7. A flash array for use with a camera having an elongated receptacle well, for receiving a blade portion of a flash array, with a substantially flat support surface disposed along a side of the receptacle well, a pair of projections extending from the support surface inwardly of the receptacle well and a plurality of resilient contact blades facing the support surface, said flash array comprising:
an elongated relatively rigid supporting board having an upper portion and a lower blade portion of a length substantially equal to the length of the camera's receptacle well;
a plurality of flash bulbs supported from said upper portion of said supporting board and disposed in side-by-side relationship lengthwise thereof;
a plurality of contact terminals on one side of said blade portion of said supporting board;
means for electrically coupling said flash bulbs to said contact terminals; and
a folded envelope including front and back panels enclosing said flash bulbs and fixed to the lower blade portion of said supporting board, said lower blade portion of said supporting board having a pair of openings spaced apart substantially the same distance as the camera projections and positioned so as to automatically make snap-fit connections with the camera's projections under the influence of the camera's resilient contact blades when said lower blade portion is inserted into the camera's receptacle well, said panel of said envelope on the other side of said lower blade portion of said supporting surface being provided with a cut out extending between said openings of said lower blade portion to expose a section of said supporting board adapted to seat firmly against the camera's support surface.

8. The flash array of claim 7 wherein said lower blade portion of said supporting board is of substantially the same length as the length of said upper portion of said supporting board.

* * * * *